May 23, 1967 JAMES E. WEBB 3,321,645

ADMINISTRATOR OF THE NATIONAL AERONAUTICS AND SPACE ADMINISTRATION

SWITCHING CIRCUIT EMPLOYING REGENERATIVELY CONNECTED COMPLEMENTARY TRANSISTORS

Filed Feb. 25, 1965

SPENCER R. SHORTRIDGE
INVENTOR.

BY [signature]
Charles C. Wells
ATTORNEY

United States Patent Office 3,321,645

Patented May 23, 1967

3,321,645

SWITCHING CIRCUIT EMPLOYING REGENERATIVELY CONNECTED COMPLEMENTARY TRANSISTORS

James E. Webb, Administrator of the National Aeronautics and Space Administration with respect to an invention of Spencer R. Shortridge, Los Angeles, Calif.

Filed Feb. 25, 1965, Ser. No. 435,387

11 Claims. (Cl. 307—88.5)

ABSTRACT OF THE DISCLOSURE

This invention relates generally to transistor switching circuits and more particularly to transistorized trigger circuits wherein power is supplied to a load only during the time that a signal is applied to the input terminal. This is accomplished through the use of a control circuit, including a pair of collector-to-base-connected, complementary transistors. The control circuit is coupled between an output terminal or load and a single source of positive operating potential in a manner such that regenerative conductivity may be achieved to thus establish current flow through the pair of transistors to provide a positive voltage step at the output terminal, and, conversely, provide a negative voltage step, to zero volts, at the output terminal when the current is interrupted through the pair of transistors. Initiation, as well as interruption of current flow through the pair of transistors, is achieved by employing a third transistor having its base connected between a signal input or trigger voltage terminal and the control circuit.

*Origin of invention*

Figure 1:
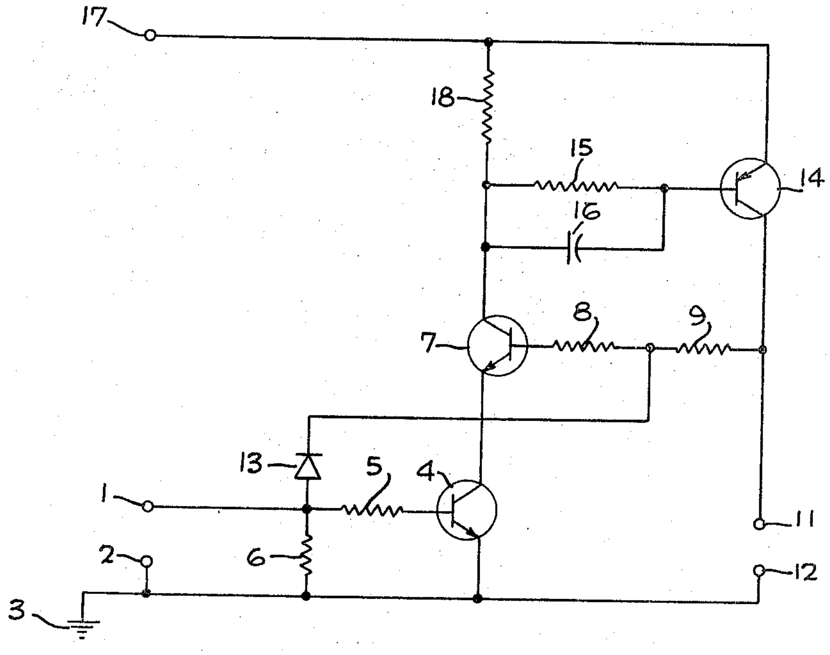

The invention described herein was made in the performance of work under a NASA contract and is subject to the provisions of Section 305 of the National Aeronautics and Space Act of 1958, Public Law 85–568 (72 Stat. 435; 42 U.S.C. 4257).

*Background of the invention*

The D.C.-coupled multivibrator commonly referred to as the "Schmitt trigger" is an important and extensively used switching circuit. This switching circuit can function as an amplitude comparator, indicating by one or the other of its two stable states, whether an input voltage is above or below a specified level. Another useful function of the Schmitt trigger is in waveshaping; the circuit provides an excellent "squaring circuit" since the output waveform will be a square wave without regard to the waveform of the input signal provided only that it reaches the preset trigger level. In another application the circuit is triggered between its two stable states by alternate positive and negative pulses. The present invention may be utilized in all of the aforementioned applications.

It is very important in space vehicles and in missiles that power supply demands be reduced to an absolute minimum in order to conserve space and weight.

*Summary*

The circuit of the present invention reduces power supply demand requirements by eliminating, for all practical purposes, power consumption when the circuit is not actually operated. Schmitt trigger circuits of the prior art are characterized by an appreciable stand-by current requirement during the period when the input signal is below the trigger level. The present invention accomplishes the functions of a conventional Schmitt trigger with a new circuit arrangement without stand-by current requirements. That is, in the stand-by condition no current is drawn except for a very small amount due to current leakage across the transistors. The circuit utilizes three transistors which are in an "off" condition or non-conducting state except when a positive voltage in excess of the trigger level is applied across the input terminals. In a typical construction a positive input signal turns on all three transistors, thus completing a circuit which permits current to flow from ground through the output load and to the positive supply terminal. Thus, power is drawn from the supply only when the preset trigger level is exceeded.

It is therefore an object of the invention to provide a switching circuit having improved economy of operation.

Another object of the invention is to provide a transistor switching circuit which essentially eliminates power consumption when the circuit is not actually operating.

It is another object of the invention to provide a novel and improved Schmitt trigger circuit which requires only a single source of operating potential.

Still another object of the invention is to provide a novel and improved transistor switching circuit of the Schmitt trigger type which has significant power requirements only during the "on" or conducting state.

Yet another object of the invention is to provide a novel and improved D.C.-trigger circuit which is particularly suitable for applications requiring a minimum power demand.

These and other objects of the invention will become more fully understood upon consideration of the following detailed description and drawings.

*Description of the preferred embodiments*

Figure 2:
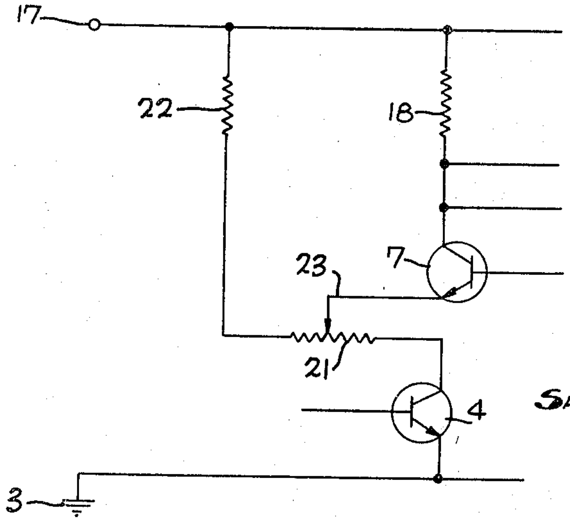

FIGURE 1 is a schematic circuit diagram of one embodiment of the invention having a fixed trigger level; and FIGURE 2 is a schematic circuit diagram of an alternative embodiment of the invention having an adjustable trigger level.

Referring now to FIGURE 1 there is shown a schematic circuit diagram of one embodiment of the invention employing two NPN and one PNP junction transistors. By way of example, this circuit may be designed to have a fixed trigger level of approximately one volt. When the amplitude of the applied input signal reaches or exceeds one volt, the circuit will switch to a conductive state and current will flow in a load connected across the output, when the input signal falls below 1 volt the circuit will return to a non-conducting state. The circuit is preconditioned to switch when the input signal reaches 0.6 volt. This feature of the circuit will be better understood after considering the description of circuit operation following the discussion of circuit construction.

The input signal is applied across input terminals 1 and 2, the latter of which is referenced to ground 3. The input signal, applied to terminal 1, is supplied to the base of NPN transistor 4 via base resistor 5, and also appears across shunt resistor 6. The emitter of transistor 4 is referenced to ground 3. The collector of transistor 4 is connected directly to the emitter of NPN transistor 7. A voltage-dividing network comprising series resistors 8 and 9 is connected between the base of NPN transistor 7 and output terminal 11. The output or load is connected across terminals 11 and 12, the latter of which is referenced to ground 3. The output circuit is designed for a load impedance, in a typical construction, which is greater than, or equal to, 500 ohms.

Diode 13 is connected from the input 1 to the midpoint of the network comprising resistors 8 and 9.

Transistor 14 is a PNP type having its base connected to the collector of transistor 7 via the RC network comprising resistor 15 and shunt capacitor 16. Positive operating potential, which for example may be of the order of +18 volts, is applied from terminal 17 to the collector of transistor 7 via resistor 18 and is also applied directly to the emitter of transistor 14. The negative terminal of the power supply is referenced to ground 3. The functioning of this circuit will now be described.

A positive input signal exceeding approximately 0.6 volt, when applied to input terminal 1, will cause transistor 4 to saturate and effectively put the emitter of transistor 7 at about 1 volt above ground 3. This action preconditions the circuit to trigger when the design trigger level of 1 volt is reached. Prior to this condition, none of the transistors is in a conducting state. When the input signal rises above the 1-volt trigger level, the base current of transistor 7 flows through diode 13, resistor 8, and transistor 4, thus causing transistor 7 to begin to conduct. Some input signal current is lost through resistor 9 and the load which is connected across terminals 11 and 12. As transistor 7 begins to conduct, transistor 14 base current will flow through the network comprising resistor 15 and capacitor 16 in parallel, and through transistors 7 and 4. This action will cause transistor 14 to begin to conduct, thus causing current to flow through the output load and additional current to flow into the base of transistor 7, thus causing transistor 7 to conduct more heavily. In turn, transistor 14 conducts more heavily and the regenerative action continues until either transistor 7 or transistor 14 saturates.

The regenerative action occurs so rapidly that the transition from a non-conducting to a conducting state of transistors 7 and 14 appears as a positive voltage step across the load (terminals 11 and 12). A negative voltage step to zero volts across the load occurs when the input signal falls below the 1 volt trigger level.

There is shown in FIGURE 2 an optional variation of the circuit wherein the trigger level may be adjusted over a given range. This circuit diagram illustrates only that portion of the circuit of FIGURE 1 which is to be modified and it should be understood that the remaining portion of the circuit not shown is identical with that of FIGURE 1. Like numbers correspond to identical parts in the two figures.

In this embodiment an adjustable resistance network is connected between the collector of transistor 4 and the emitter of transistor 7. This network comprises potentiometer 21 having one terminal connected to the collector of transistor 4 and the other terminal connected to resistor 22. Resistor 22 in turn is connected to the positive power supply terminal 17. The arm 23 of potentiometer 21 is connected to the emitter of transistor 7. In this embodiment resistor 22, potentiometer 21 and transistor 4 when in its conducting state form a voltage divider which is tapped by the arm 23 of potentiometer 21 to provide an adjustable trigger level voltage at the emitter of transistor 7. Resistor 22 establishes a maximum limit of adjustment. The saturated voltage drop of transistor 4 establishes the minimum limit of adjustment.

By way of example, the following list shows typical values of the components used in the circuits, as shown in FIGURES 1 and 2.

| | |
|---|---|
| Resistor **5** | 1K |
| Resistor **6** | 56K |
| Resistor **8** | 1K |
| Resistor **9** | 33K |
| Resistor **15** | 6.8K |
| Resistor **18** | 56K |
| Resistor **22** | 5K |
| Potentiometer **21** | 1K |
| Capacitor **16** ---- μμf | 750 |
| Diode **13** | 1N914 |
| NPN transistor **4** | 2N910 |
| NPN transistor **7** | 2N910 |
| PNP transistor **14** | 2N1132 |

As can be seen from the foregoing there has been provided by the present invention a Schmitt trigger wherein no stand-by operating current is required, exclusive of transistor leakage current. Another advantage of the circuit of the invention is that it requires only a single source of operating potential. Furthermore, the circuit of the invention provides zero output voltage, for all practical considerations, in contrast to conventional Schmitt trigger circuits wherein the minimum output potential attainable is measured in volts.

While there have been shown and described and pointed out the fundamental novel features of the invention as applied to preferred embodiments, it will be understood that various omissions and substitutions and changes in the form and details of the devices illustrated and in their operation may be made by those skilled in the art, without departing from the spirit of the invention; therefore, it is intended that the invention be limited only as indicated by the scope of the following claims.

What is claimed is:

1. A switching circuit responsive to an input trigger signal having a selectively variable trigger level, comprising:
   - an input terminal for receiving said input trigger signal;
   - a pair of normally non-conducting regeneratively connected transistors having opposite types of conductivity;
   - a source of operating potential terminal connected with said pair of transistors;
   - a normally non-conducting input transistor stage connected between said input terminal and said pair of regeneratively connected transistors, said input transistor stage being adapted to conduct in response to a given level of said input trigger signal and thereby apply an operating bias to one transistor of said pair of regeneratively connected transistors;
   - means including a three-terminal adjustable resistance network connected between said input transistor stage, one transistor of said pair of transistors and the source of operating potential terminal for adjusting the level at which said stage will conduct;
   - a diode connected between said input terminal and said pair of regeneratively connected transistors for causing said one transistor to begin to conduct when said input transistor stage is conducting and when said input trigger signal exceeds said given level; and,
   - output circuit means connected to the other transistor of said pair of regeneratively connected transistors for providing an output step-function signal in response to the regenerative conduction of said pair of transistors initiated by the commencement of conduction of said one transistor.

2. A voltage responsive switching circuit, comprising:
   - first and second transistors of like conductivity type and a third transistor of opposite conductivity type, each of said transistors having a base, an emitter, and a collector;
   - means connecting the collector of said first transistor to the emitter of said second transistor;
   - network means connecting the collector of said second transistor to the base of said third transistor;
   - a source of operating potential connected to said network means and to the emitter of said third transistor;
   - a voltage dividing network connected between the base of said second transistor and the collector of said third transistor, said dividing network having an intermediate terminal;
   - input circuit means connected to the base of said first transistor for receiving an input voltage;
   - output circuit means connected to the collector of said third transistor;
   - a common reference terminal for said input circuit means, the emitter of said first transistor, said source of operating potential, and said output circuit means; and a diode connected between said intermediate terminal and said input circuit means.

3. A voltage responsive switching circuit as defined in claim 2 wherein said connecting means comprises:

a direct connection between the collector of said first transistor and the emitter of said second transistor.

4. A voltage responsive switching circuit as defined in claim 2 wherein said connecting means comprises:

a three-terminal adjustable resistance network connected between the collector of said first transistor, said source of operating potential, and the emitter of said second transistor whereby the voltage amplitude at which said switching circuit responds may be selectively adjusted.

5. A switching circuit responsive to the application of a given input trigger level to provide a step-function output signal, comprising:

a pair of NPN transistors and a PNP transistor, each of said transistors having a base, an emitter, and a collector;

means connecting the collector of one of said NPN transistors to the emitter of the other of said NPN transistors;

impedance means connecting the collector of said other NPN transistor to the base of said PNP transistor;

means for supplying an operating potential to the collector of said other NPN transistor and to the emitter of said PNP transistor, said operating potential supply means being referenced to ground;

a first output terminal connected to the collector of said PNP transistor;

a second output terminal connected to ground;

a voltage dividing network connected between said output terminal and the base of said other NPN transistor;

input circuit means connected to the base of said one NPN transistor for receiving said trigger level; and a diode connected between said input circuit means and the intermediate connection to said voltage dividing network.

6. In combination:

first and second transistors of like conductivity type and a transistor of opposite conductivity type, each of said transistors being normally non-conducting and each having an emitter, a collector, and a base;

input circuit means connected to the base of said first transistor;

means for connecting the emitter of said first transistor to a ground reference;

a first circuit path interconnecting the collector of said first transistor with the emitter of said second transistor;

a second circuit path interconnecting the collector of said second transistor with the base of said third transistor;

said second circuit path including a resistance-capacitance network;

a signal output terminal;

a series resistance network connecting the base of said second transistor to said output terminal;

means connecting the collector of said third transistor directly to said output terminal;

a diode having one end connected to said input circuit means and the other end to an intermediate point of said series resistance network; and, a source of operating potential connected to the emitter of said third transistor, and to the junction between said resistance capacitance network, and to the collector of said second transistor, whereby an input signal applied to said input circuit means will cause conduction of said first, second, and third transistors.

7. The combination defined in claim 6 wherein said input circuit means comprises:

a signal input terminal;

a first resistor connected between said signal input terminal and said ground reference;

a second resistor connected between said input terminal and the base of said first transistor; and means connecting said one end of said diode to said input terminal.

8. The combination defined in claim 6 wherein said first circuit path includes:

a three-terminal resistance network having its first terminal connected to the collector of said first transistor, its second terminal connected to the emitter of said second transistor, and its third terminal connected to said source of operating potential.

9. The combination defined in claim 6 having:

a resistance connected in series between said junction and said source of operating potential.

10. A trigger circuit responsive to changes in the amplitude of an input voltage about a given trigger level to provide a step-function output signal, said circuit comprising:

first and second normally non-conducting NPN junction transistors;

a normally non-conducting PNP junction transistor, each of said transistors having a collector, an emitter, and a base;

means for supplying an operating voltage to the collector of said second NPN transistor, and to the emitter of said PNP transistor, said voltage supply means being referenced to ground;

a connection from the collector of said first NPN transistor to the emitter of said second NPN transistor;

a connection between the emitter of said first NPN transistor and ground;

a voltage dividing network in series with the base of said second NPN transistor and the collector of said PNP transistor;

an RC network connected in series with the collector of said second NPN transistor and the base of said PNP transistor;

an input terminal;

a resistor connected between said input terminal and the base of said first NPN transistor;

a diode connected between said input terminal and the intermediate connection of said voltage divider; and output terminal means for connecting a load between ground and the collector of said PNP transistor.

11. A trigger circuit responsive to changes in the amplitude of an input voltage about a given trigger level to provide a step-function output signal, said circuit comprising:

first and second normally non-conducting NPN junction transistors;

a normally non-conducting PNP junction transistor, each of said transistors having a collector, an emitter, and a base;

means for supplying an operating voltage to the collector of said second NPN transistor, and to the emitter of said PNP transistor, said voltage supply means being referenced to ground;

a first voltage dividing network connected between the collector of said first NPN transistor and said voltage supply means and having its intermediate connection connected to the emitter of said second NPN transistor;

a connection between the emitter of said first NPN transistor and ground;

a second voltage dividing network in series with the base of said second NPN transistor and the collector of said PNP transistor;

an RC network connected in series with the collector of said second NPN transistor and the base of said PNP transistor;

an input terminal;

a resistor connected between said input terminal and the base of said first NPN transistor;

a diode connected between said input terminal and the intermediate connection of said voltage divider; and output terminal means for connecting a load between ground and the collector of said PNP transistor.

References Cited by the Examiner

UNITED STATES PATENTS

| | | | |
|---|---|---|---|
| 2,939,967 | 6/1960 | Redpath et al. | 307—88.5 |
| 3,121,802 | 2/1964 | Palmer | 307—88.5 |
| 3,235,750 | 2/1966 | Anderson et al. | 307—88.5 |

References Cited by the Applicant

UNITED STATES PATENTS

| | | |
|---|---|---|
| 2,933,692 | 4/1960 | Meyers. |
| 2,936,382 | 5/1960 | Goulding. |
| 2,997,606 | 8/1961 | Hamburger et al. |
| 3,089,041 | 5/1963 | Boensel. |
| 3,113,219 | 12/1963 | Gilmore. |
| 3,114,049 | 12/1963 | Blair. |
| 3,122,646 | 2/1964 | Deysher et al. |
| 3,123,721 | 3/1964 | Kaufman. |

ARTHUR GAUSS, *Primary Examiner.*

J. JORDAN, *Assistant Examiner.*